July 3, 1923.
R. CARLSTEDT
STEAM TRAP
Filed Jan. 2, 1920
1,460,746
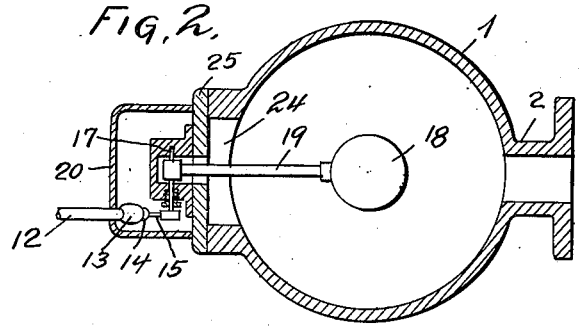
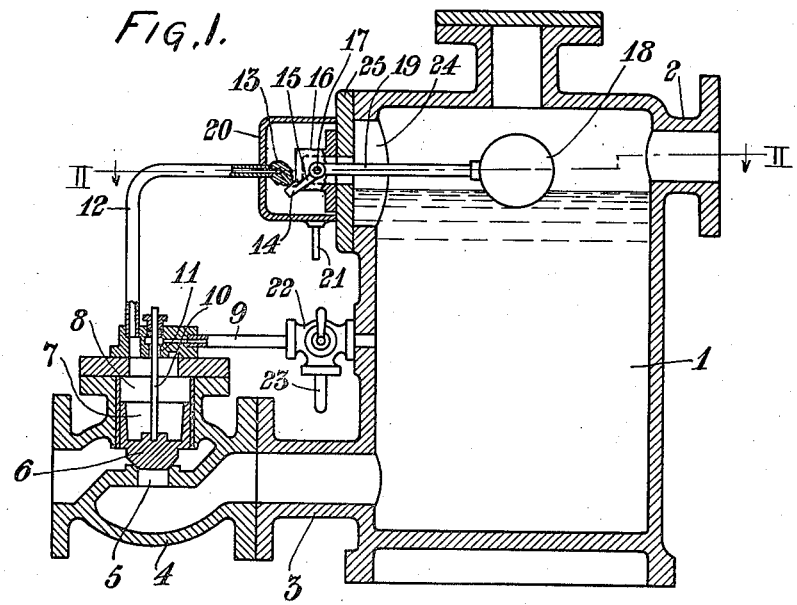
Inventor:
Ragnar Carlstedt
By George Bayard Jones
Attorney Patented July 3, 1923

1,460,746

UNITED STATES PATENT OFFICE.

RAGNAR CARLSTEDT, OF STOCKHOLM, SWEDEN, ASSIGNOR TO AKTIEBOLAGET ARCA REGULATORER, OF STOCKHOLM, SWEDEN, A COMPANY OF SWEDEN.

STEAM TRAP.

Application filed January 2, 1920. Serial No. 349,025.

*To all whom it may concern:*

Be it known that I, RAGNAR CARLSTEDT, a subject of the King of Sweden, residing at Stockholm, in the Kingdom of Sweden, have invented a new and useful Improvement in Steam Traps (for which I have filed application for patent in Sweden, Dec. 7, 1918), of which the following is a specification.

Steam traps as heretofore used are as a rule provided with a float mechanically connected with the outlet or drain-valve of the trap in such manner that when the float is raised owing to the water level rising in the steam trap, the valve is opened to a greater extent, so that the outflow opening for the condensed water becomes enlarged, and vice versa, an automatic regulation of the drainage thus being attained. The mere adjustment of the drain-valve requires a rather considerable power, however, and in addition some power will be lost owing to friction in the mechanical connection between the float and the valve, on account whereof the amount of work to be produced by the float becomes too great for attaining an accurate and reliable regulation.

The present invention relates to an improved arrangement of steam traps by means of which a very accurate regulation of the position of the drain-valve is attained, and simultaneously, sufficient power for the adjustment of the valve is obtained. The invention is principally characterized by this that the drain-valve is connected with a piston or the like which is actuated by a flowing liquid under pressure in a conduit provided with an outflow opening in front of which a plate or the like is located, said plate being connected with the float in such manner that during the movements of the float due to the water level in the steam trap falling or rising, the plate is moved towards or away from said outflow opening, so that the outflow of the liquid under pressure through said opening is checked more or less. The pressure exerted on the piston by the liquid under pressure will thus be increased or decreased, so that the outflow opening for the condensed water past the drain-valve becomes decreased or increased.

The accompanying drawing illustrates in Fig. 1 a vertical section of an embodiment of a steam trap according to the present invention, and in Fig. 2 a horizontal section on the line II—II in Fig. 1, certain parts being omitted.

The condensed water enters the vessel 1 of the steam trap through the flanged socket 2 and escapes through the pipe 3 to the valve opening 5 in the valve casing 4, which opening is regulated by the valve 6. Said valve is connected with a piston 7 movable in a pressure chamber 8 into which liquid under pressure is admitted from a conduit 9 through a contraction in said conduit, which contraction consists of a narrow channel 11 around the stem 10 of the piston and valve. From the pressure chamber 8 the liquid under pressure flows through the conduit 12 to the outflow opening 13. In front of said opening a plate 14 is provided on an arm 15 secured on the turning pivot 17 of the lever 19 supporting the float 18 in the vessel 1, on an end of said pivot 17 projecting through the bearing 16 for the pivot, tightness being obtained by means of any suitable packing around said pivot so as to prevent leakage through the bearing. The outflow opening 13 and the arm 15 with the plate 14 are provided within a casing 20, so that the liquid under pressure which flows out through the opening 13 between the orifice of said opening and the plate 14, may be collected in said casing and drained through the pipe 21.

The liquid under pressure supplied to the pressure chamber 8 through the pipe 9 may consist of the water condensed in the vessel 1, and for this purpose the pipe 9 is shown connected to said vessel by means of a cock 22. In order to render it possible, however, to use another liquid under pressure, if the condensed water is too impure, or if for other reasons its use would be less suitable, the cock 22 may suitably be a three-way cock, so that the connection with the vessel 1 may be shut off and instead liquid under pressure supplied from a special conduit 23.

The operation of the device is easily understood. If for instance the level of the condensed water in the vessel 1 falls, the float 18 sinks and the plate 14 on the arm 15 is moved towards the nozzle or outflow opening 13, on account whereof the resistance to the outflow of the liquid under pressure through said opening becomes increased, so that the pressure exerted by the liquid under pressure on the piston 7 becomes increased, on account whereof the piston is moved in the chamber 8, so that the valve 6 is moved towards its seat with the result that the outflow opening at 5 becomes decreased. Consequently, a smaller quantity of condensed water escapes from the vessel 1. On the other hand, if the level of the condensed water rises, the float 18 is raised and the plate 14 is moved away from the outflow opening 13, on account whereof the resistance to the outflow of the liquid under pressure becomes decreased, so that the pressure on the piston 7 becomes decreased, owing whereto the valve 6 is more opened under the influence of the pressure of the condensed water on said valve. It will thus be obvious that a perfectly automatic regulation is attained. The power necessary for the adjustment of the valve is supplied by the liquid under pressure, and the float 18 needs deliver practically no work as it may be journaled practically frictionless.

The contraction 11 in the conduit for the liquid under pressure is of course necessary in order that the variations in the resistance to the outflow of the liquid through the opening 13 shall produce variations in the pressure in the pressure chamber 8. One wall of said contraction 11 consisting of the stem 10, which will move to and fro in the contraction during the operation of the device, it is attained that the contraction will always be maintained clean and thus can not be clogged by impurities possibly contained in the liquid under pressure. At the same time the contraction serves to prevent such impurities from passing into the pressure chamber 8 and from thence to the outflow opening 13 which would easily be clogged by the same.

The float in a steam trap ordinarily consists of a metal ball filled with air, and said ball being constantly under pressure, and it being difficult to manufacture said ball in such manner that it will always remain absolutely tight, water will gradually be forced into the same, and for this reason and also for other reasons it is often necessary to take out and inspect the float. In order to render such removal and inspection possible in a simple manner the arrangement is provided, according to the present invention, that the vessel 1 is provided with an opening 24 of sufficient size for introducing and removing the float ball through the same, said opening being covered by a disk or plate 25 screwed onto or secured in such other manner to the vessel 1 over said opening as to produce a fluid-tight connection between said plate 25 and said vessel 1. The bearing 16 and the cover 20 are also secured to said plate in such manner as to form fluid tight connections between each of said members and said plate 25. It will be understood that it is only necessary to unscrew the plate 25 for removing the float. The pipe conduits 12 and 21 should of course be previously disconnected in suitable manner.

I claim:

1. In a steam trap, the combination of a vessel, a drain-valve from said vessel, a conduit for a flowing liquid under pressure, a member connected with said valve and inserted in said conduit so as to be actuated in one direction by the liquid in the same, an outflow opening on said conduit, a plate located in front of said outflow opening and movable towards and away from the same, and a float in said vessel connected with said plate in such manner as to impart motion to the same.

2. In a steam trap, the combination of a vessel, a drain-valve from said vessel, a conduit for a flowing liquid under pressure, a member connected with said valve and inserted in said conduit so as to be actuated in one direction by the liquid in the same, an outflow opening on said conduit, a plate located in front of said outflow opening and movable towards and away from the same, a float in said vessel connected with said plate in such manner as to impart motion to the same, said vessel being provided with an opening of such size that the float may be introduced and removed through the same, and a plate secured over and closing said opening, said float being journaled in said plate.

3. In a steam trap, the combination of a vessel, a drain-valve from said vessel, a conduit for a flowing liquid under pressure connected with said vessel, a member connected with said valve and inserted in said conduit so as to be actuated in one direction by the liquid in the same, an outflow opening on said conduit, a plate located in front of said outflow opening and movable towards and away from the same, and a float in said vessel connected with said plate in such manner is to impart motion to the same.

RAGNAR CARLSTEDT.